(12) United States Patent
Miyazaki et al.

(10) Patent No.: US 8,307,867 B2
(45) Date of Patent: Nov. 13, 2012

(54) PNEUMATIC TIRE WITH TREAD INCLUDING SIPE HAVING WIDE PORTIONS LOCATED ALTERNATELY ON BOTH SIDE WALLS

(75) Inventors: Tetsuji Miyazaki, Osaka (JP); Yoshinori Asayama, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 375 days.

(21) Appl. No.: 12/547,551

(22) Filed: Aug. 26, 2009

(65) Prior Publication Data

US 2010/0084062 A1 Apr. 8, 2010

(30) Foreign Application Priority Data

Oct. 3, 2008 (JP) .................................. 2008-258619

(51) Int. Cl.
*B60C 11/12* (2006.01)
(52) U.S. Cl. .......... 152/209.21; 152/209.24; 152/DIG. 3
(58) Field of Classification Search ............. 152/209.18, 152/209.21, 209.24, DIG. 3
See application file for complete search history.

(56) References Cited

FOREIGN PATENT DOCUMENTS

| EP | 213452 A2 * | 3/1987 |
|---|---|---|
| EP | 1829672 A1 * | 9/2007 |
| JP | 07-276923 A * | 10/1995 |
| JP | 09-272312 | 10/1997 |
| JP | 11-078430 | 3/1999 |
| JP | 2000-102925 A * | 4/2000 |
| JP | 2000-318413 | 11/2000 |
| JP | 2005-329793 A * | 12/2005 |
| JP | 2007-223493 | 9/2007 |
| WO | WO-2009/077499 A1 * | 6/2009 |

OTHER PUBLICATIONS

Machine translation for Europe 213,452 (no date).*
Machine translation for JP 2005-329793 (no date).*
Machine translation for Japan 2000-102925 (no date).*
Machine translation for Japan 07-276923 (no date).*
Machine translation for Europe 1,829,672 (no date).*

* cited by examiner

*Primary Examiner* — Steven D Maki
(74) *Attorney, Agent, or Firm* — Fish & Richardson P.C.

(57) ABSTRACT

An object of the present invention is to provide a pneumatic tire capable of ensuring both of the ice braking performance and the ice turning performance while increasing the dry steering stability performance. To achieve the above object, a sipe extending in a width direction of the tire is formed a land portion, the sipe having: pluralities of wide portions each having an inclined plane that begins from the tread surface of a road surface, and terminates in the half way of a sipe wall while inclining so that a sipe width decreases toward the groove bottom of the sipe, and a pair of side faces connecting the inclined plane and the sipe wall therebetween, wherein the pluralities of wide portions are located alternately on both sipe walls along a longitudinal direction of the sipe.

1 Claim, 3 Drawing Sheets

PNEUMATIC TIRE WITH TREAD INCLUDING SIPE HAVING WIDE PORTIONS LOCATED ALTERNATELY ON BOTH SIDE WALLS

BACKGROUND OF THE INVENTION

1. Field of the Invention

The present invention relates to a pneumatic tire comprising a tread surface including a land portion in which a sipe extending in a width direction of the tire is formed, more particularly to a pneumatic tire useful as a winter tire.

2. Description of the Related Art

Conventionally, winter tires have a land portion such as a block and a rib formed with pluralities of cuts called as sipes therein. These sipes generate edge effect and water removal effect and increase running performance of a tire on an icy road surface, which has a small friction coefficient (hereinafter, referred to as "ice performance"). As such sipes, straight sipes extending straight along a longitudinal direction thereof, wave-like sipes extending in a wave-like shape, or the like are practically used.

For example, Japanese Patent Application Laid-Open Publication No. 2007-223493 described below discloses a pneumatic tire as described below. That is, the pneumatic tire includes pluralities of blocks formed on a tread surface thereof, and each of the blocks is formed with one or more sipes extending in a width direction of the tire. In an opening portion, at the front side as viewed in a rotation direction of the sipe, an inclined plane, which is inclined in a rotation direction toward the outer side in the radius direction of the tire, is formed. In the above pneumatic tire, pluralities of inclined planes are formed at the opening side of the sipes. The edge portion of the inclined plane increases the edge effect and enhances the braking performance on an icy road surface (hereinafter, referred to as "ice braking performance"). However, the above pneumatic tire has no edge element acting in the width direction of the tire (turning directions). Therefore, the pneumatic tire still has a room to improve the turning performance on an icy road surface (hereinafter, referred to "ice turning performance"). Moreover, in such pneumatic tire, when the sipe is formed with an inclined plane of a larger inclination angle in order to increase the edge effect, the block formed with the sipes is reduced in the rigidity thereof. As a result, the steering stability on dry surface (hereinafter, referred to as "dry steering stability performance") decreases, or the blocks tend to wear unevenly in the front and rear portions thereof.

Japanese Patent Application Laid-Open Publication No. 9-272312 described below discloses a pneumatic tire as described below. That is, the pneumatic tire includes pluralities of blocks formed on a tread surface thereof, and each of the blocks is formed with sipes extending in the width direction of the tire. Each of the sipes is arranged so that the width of the sipe is made wider than the other portion from the tread surface to the sipe bottom at least at three points including the both ends of the sipe. However, the pneumatic tire has no inclined plane at the opening side of the sipe. Therefore, the edge effect of the sipe is insufficient and the tire has a point to be further improved in both of ice braking performance and ice turning performance. Moreover, the sipe is arranged so that the width thereof is made wider than the other portion from the tread surface to the sipe bottom at least at three points including the both ends thereof. Therefore, the block formed with the sipe tends to lose the rigidity and dry steering stability performance is easily reduced; or the blocks tend to be worn unevenly in the front and rear portions thereof.

Japanese Patent Application Laid-Open Publication No. 2000-318413 described below discloses a pneumatic tire as described below. That is, the pneumatic tire includes a tread surface formed with pluralities of sipes thereon. The sipe includes a main portion extending in the identical direction and a connecting portion extending in a direction substantially perpendicular to the main portion. The neighboring main portions are arranged to be inclined in an opposite directions with respect to the radius direction of the tire so that the distance therebetween becomes larger as the depth increases. Japanese Patent Application Laid-Open Publication No. 11-7843 described below discloses a pneumatic tire as described below. That is, the pneumatic tire has a tread surface formed with pluralities of sipes thereon. The sipes are arranged to be separated away from each other at the tread surface which comes in contact with the road surface and become closer or connected to each other at the groove bottom side. However, these pneumatic tires fail in obtaining sufficient edge effect by the sipes. Therefore, the tires have a room to be improved in the both aspects of the ice braking performance and the ice turning performance.

SUMMARY OF THE INVENTION

The present invention has been proposed in view of the above circumstances. It is an object of the present invention to provide a pneumatic tire capable of ensuring both of the ice braking performance and the ice turning performance while increasing the dry steering stability performance.

The above-mentioned object can be achieved by the present invention as follows. That is, the present invention provides a pneumatic tire comprising a tread surface including a land portion in which a sipe extending in a width direction of the tire is formed, the sipe having: pluralities of wide portions each having an inclined plane that begins from the tread surface of a road surface, and terminates in the half way of a sipe wall while inclining so that a sipe width decreases toward the groove bottom of the sipe, and a pair of side faces connecting the inclined plane and the sipe wall therebetween, wherein the pluralities of wide portions are located alternately on both sipe walls along a longitudinal direction of the sipe.

According to the above-described pneumatic tire, each of the pluralities of sipes extending in the width direction of the tire include a wide portion having an inclined plane that begins from the tread surface of the road surface, and terminates in the half way of the sipe wall while inclining so that a sipe width decreases toward the groove bottom of the sipe. Therefore, the edge portion of the inclined plane generates a large ground pressure, and thereby the edge effect acting in the circumferential direction of the tire accordingly increases. Further, the sipe includes the pluralities of wide portions that are located alternately on the both sipe walls along the longitudinal direction of the sipe. Therefore, at braking and accelerating on an icy road surface, the edge effect acting due to the edge portion of the inclined plane increases. Furthermore, when the sipe includes the pluralities of wide portions located alternately on the both sipe walls along the longitudinal direction of the sipe, the inclined plane can be arranged to have a large inclination angle with respect to the sipe walls while preventing the rigidity of the land portion forming the sipe from being reduced. As a result, particularly, the ice braking performance of the pneumatic tire is increased while increasing the dry steering stability performance.

Also, in the above-described pneumatic tire, the sipe includes the pluralities of wide portions having the pair of side faces connecting the inclined plane and the sipe walls. Therefore, the edge portion of the side faces generates a large ground pressure as well as the edge effect acts in the width direction of the tire (turning directions). As a result, the ice turning performance of the pneumatic tire is increased.

In the above-described pneumatic tire, it is preferred that the pair of side faces of the wide portion incline toward the groove bottom of the sipe so that the length of the inclined plane deceases. In the pneumatic tire as described above, the sipe includes the pluralities of wide portions in which the pair of side faces inclining toward the groove bottom of the sipe so that the length of the inclined plane decreases. Therefore, particularly, the edge portions of the side faces generate a large ground pressure, and the edge effect acting in the turning directions is further increased. As a result, the ice turning performance of the pneumatic tire is particularly increased.

DETAILED DESCRIPTION OF THE PREFERRED EMBODIMENTS

Figure 1:
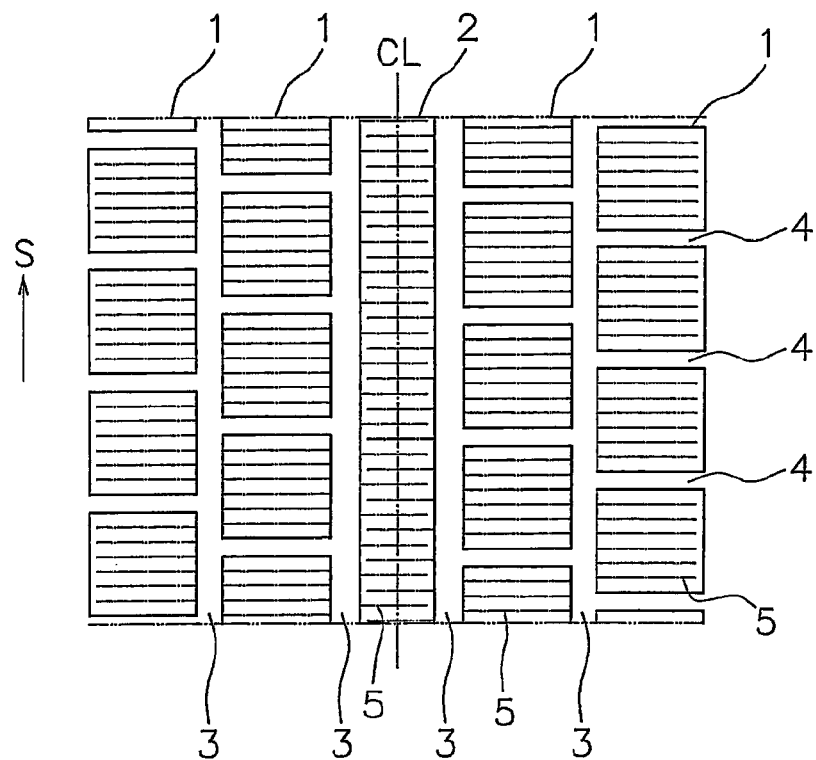
FIG. 1 illustrates an example of a tread surface in a pneumatic tire according to the present invention.

Embodiments of the present invention will be described below with reference to the accompanied drawings. FIG. 1 illustrates an example of a tread surface in a pneumatic tire according to the present invention. The pneumatic tire has a tread pattern including pluralities of blocks 1 (an example of a land portion) and a rib 2 (an example of the land portion). The blocks 1 are partitioned into four block lines by main grooves 3 that extend in a circumferential direction of the tire and lateral grooves 4 that extend in a lateral direction of the tire. Referring to FIG. 1, the lateral grooves 4 included in each of the block rows, which partition the respective blocks 1, are disposed being displaced from each other in the circumferential direction of the tire. The rib 2 is partitioned by the two main grooves 3 extending in the circumferential direction of the tire. The rib 2 is located at the innermost position in the width direction of the tire with the equator line CL of the tire sandwiched. An arrow "S" indicates a rotation direction of the tire mounted on a vehicle.

The blocks 1 and the rib 2 are formed with sipes 5 each extending in the width direction of the tire. In order to enhance the ice braking performance and the ice turning performance, the block 1 is preferably formed with at least two sipes 5. In the example shown in FIG. 1, each of the blocks 1 is formed with six sipes 5. On the other hand, the rib 2 may be formed with an appropriate number of sipes 5 at a predetermined distance. According to the present invention, each of the sipes 5 may be closed at one or both sides by side wall(s) of each of the blocks 1 and/or rib 2, or the both ends thereof may be opened.

Figure 2:
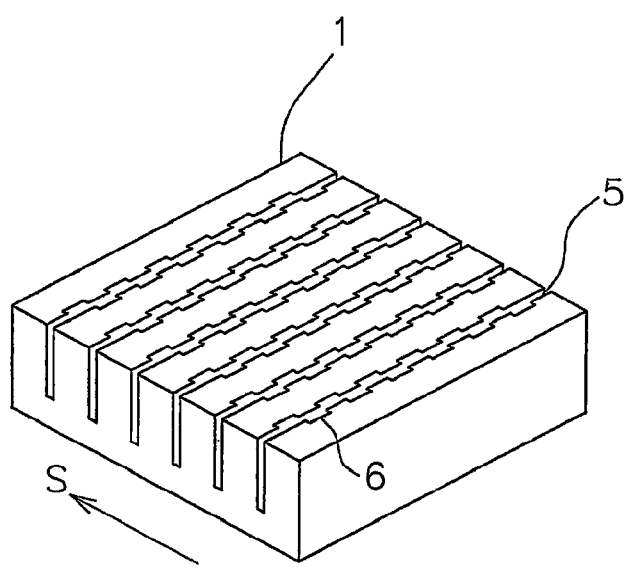
FIG. 2 is a perspective view of a block.
Figure 3:
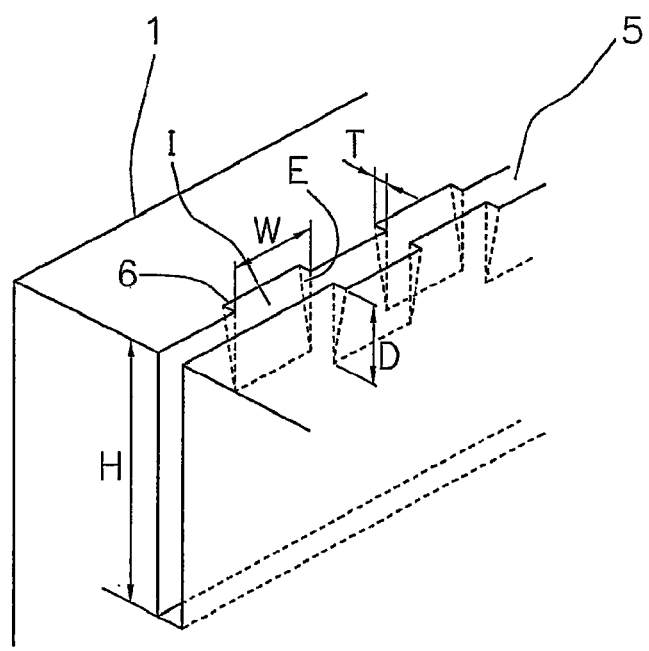
FIG. 3 is an enlarged view of a portion of a sipe.

FIG. 2 is a perspective view of a block 1. FIG. 3 is a partially enlarged view of a sipe 5. As shown in FIGS. 2 and 3, each of the sipes 5 extending in the width direction of the tire includes pluralities of wide portions 6 each having an inclined plane I and side faces E, the inclined plane I beginning at the tread surface of a road surface and terminating in the half way of a sipe wall while inclining with respect to a radius direction of the tire so that the a width decreases toward the groove bottom of the sipe. The pair of side faces E connects the inclined plane I and the sipe wall therebetween. With this arrangement, in the pneumatic tire according to the present invention, the edge portion of the inclined plane I increases the edge effect acting in the circumferential direction of the tire (braking direction). At the same time, a pair of the edge portions of the side faces E causes the edge effect to act in the width direction of the tire (turning directions). Further, the sipe 5 includes the pluralities of wide portions 6 located alternately at the both sides of the sipe 5 along the sipe walls extending in the longitudinal direction of the sipe. Therefore, a large inclination angle of the inclined plane I is obtained with respect to the sipe wall while preventing the rigidity of the land portion forming the sipe 5 from being reduced. As a result, in the pneumatic tire according to the present invention, both of the ice braking performance and the ice turning performance are ensured while increasing the dry steering stability performance.

In order to ensure both of the ice braking performance and the ice turning performance while increasing the dry steering stability performance, it is preferred that the following conditions are satisfied. That is, a length W of the inclined plane I in the longitudinal direction of the sipe on the tread surface of the road surface is preferably 1 to 4 mm; a depth D of the inclined plane I from the tread surface of the road surface is preferably 0.5 to 4 mm; and a length T of the side faces E on the tread surface of the road surface is preferably 0.2 to 0.6 mm. Further, the ratio (D/H) of the depth D of the inclined plane I with respect to the depth H of the sipe 5 is preferably 7 to 40%. When the ratio (D/H) of the depth D of the inclined plane I with respect to the depth H of the sipe 5 is not within the above range, the edge effect that acts at the edge portion of the inclined plane I tends to be reduced.

As shown in FIGS. 2 and 3, according to the embodiment, the sipe 5 includes the pluralities of wide portions 6 disposed successively at the both sides of the sipe alternately along the sipe walls in the longitudinal direction of the sipe. In this case, the inclined planes I are also successively disposed alternately at the both sides of the sipe walls along the longitudinal direction of the sipe. Thereby, while the rigidity of the block 1 is prevented from being reduced, the edge effect that acts in the circumferential direction (particularly in the braking direction) can be effectively increased.

FIGS. 1 to 3 illustrate an example in which each of the sipes 5 is a straight sipe. The present invention is not limited to the above. When the above-described wide portions are included while being located alternately at the both sides along the sipe walls in the longitudinal direction of the sipe, the sipe may be formed in a wave-like sipe or a zigzag sipe. In the wave-like sipe or zigzag sipe, compared to the straight sipe, the opening portion of the sipe is hardly narrowed. Therefore, in addition to the effect to prevent the wide portion from becoming narrower, the edge effect and the water removal effect by the sipes can be effectively ensured as well as the land portion on dry road surface can be prevented from being collapsed.

The pneumatic tire of the present invention is the same as the conventional pneumatic tires except that the above-described sipes are formed in the land portion. Therefore, any of the conventionally known materials, shapes, structures, manufacturing methods and the like may be applied to the present invention.

The pneumatic tire of the present invention is applicable to so-called summer tires. However, the pneumatic tire of the present invention is superior in the ice performances. Therefore, the pneumatic tire of the present invention is particularly useful as winter tire (so-called studless tire).

Other Embodiments (1) In the above-described embodiment, particularly, an example has been given, in which the block 1 is formed with the pluralities of sipes 5 including pluralities of wide portions 6 each having a inclined plane I and a pair of side faces E, the inclined plane I beginning at the tread surface of the road surface, and terminating in the half way of the sipe wall while inclining so that a sipe width decreases toward the groove bottom of the sipe 5, and the pair of side faces E each connecting the inclined plane I and the side wall of the sipe. However, in the present invention, the rib 2 may be formed with sipes 5 having the similar wide portions 6.

Figure 4:
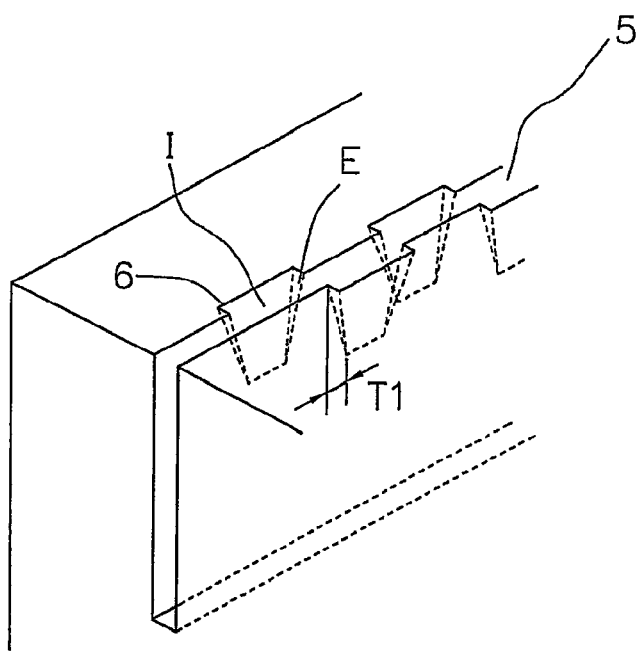
FIG. 4 is an enlarged view of a portion of the sipe.

(2) The above-described embodiment describes an example, in which the side faces E are not inclined with respect to the radius direction of the tire. As shown in FIG. 4, however, each of the side faces E of the wide portion 6 may be inclined so that the length of the inclined plane I in the longitudinal direction of the sipe decreases toward the groove bottom of the sipe 5. In this case, the edge effect that acts in the turning directions by the edge portions of the side faces E is further increased. As a result, the ice turning performance of the pneumatic tire can be preferably increased. To increase the ice turning performance more while increasing the ice braking performance, a length T1 of each of the side faces E in the longitudinal direction shown in FIG. 4 is preferably 0.3 to 1 mm.

Figure 5:
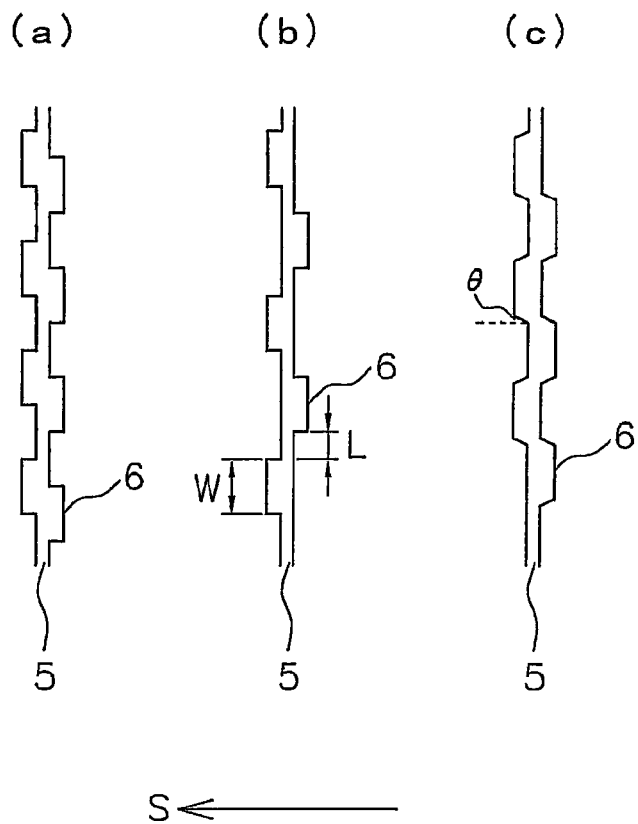
FIGS. 5A to 5C show examples of shapes of sipes of a tread surface of a road surface.

(3) The above-described embodiment describes an example, in which pluralities of wide portions 6 are disposed alternately on the both sipe walls successively along the sipe 5 in the longitudinal direction of the sipe. As shown in FIG. 5A, however, the wide portions 6 may be disposed alternately on the both sipe walls being overlapped with each other along the longitudinal direction of the sipe. In this case, even when the sipe is collapsed, since the volume of the groove is ensured by the overlapped wide portions 6 located on the both sipe walls, the water removal effect of the sipe tends to be increased. Further, as shown in FIG. 5B, pluralities of wide portions 6 may be disposed successively on the both sipe walls alternately along the longitudinal direction of the sipe with a specific distance L therebetween. In this case, the ratio (L/W) of a distance L between wide portions 6 with respect to a length W in the longitudinal direction of the sipe on the tread surface of the road surface is preferably 50% or less. When the L/W is too large, the ratio of the length W of the inclined plane I with respect to the total length of the sipe 5 is reduced and the number of the side faces E is also reduced. As a result, the ice braking performance and the ice turning performance of the pneumatic tire tend to be reduced.

(4) In the above-described embodiment, an example, in which the shape of the wide portion 6 formed on the tread surface, which is marked on road surface, is rectangular, has been given. However, as shown in FIG. 5C, the shape of the wide portion 6 may be formed to be trapezoid. In this case, to maintain the edge effect by the side faces E, the angle θ, which is formed between the side face E and the tread surface of the road surface and the circumferential direction (rotation direction) S, is preferably 35° or less.

EXAMPLES

Examples that particularly show the arrangement and effect of the present invention will be described bellow. Evaluation of the performance of the respective tires was carried out as described below.

(1) Ice Braking Performance

Evaluation was made by mounting test tires (tire size: 195/65R15) on an actual vehicle (1500 cc class sedan (4 WD vehicle)) to make the actual vehicle run on an icy road surface until 40 km/h, and then measuring a breaking distance when activating ABS of the actual vehicle by applying a breaking force thereto. The inverse number of the braking distance of a Comparative Example 1 is indicated as 100 with an index number. This indicates that the larger the value is, the better ice breaking performance is.

(2) Ice Turning Performance

Evaluation was made by mounting test tires on the above-mentioned actual vehicle to make the actual vehicle run on an icy road surface, and then measuring Value of lateral force (G) acting on all tires when making a J-turn at a speed of 20 km/h. The value of lateral force (G) on the Comparative Example 1 is indicated as 100 with an index number. This indicates that the larger the value is, the better ice tuning performance is.

(3) Dry Steering Stability Performance

A feeling Evaluation was made by mounting test tires on the above-mentioned actual vehicle to make the actual vehicle run on an ordinary dry road with a load of one person, and then evaluating the assessment points with an index number. The assessment of the Comparative Example 1 is indicated as 100 with the index number. This indicates that the larger the value is, the better dry steering stability performance is.

Comparative Example 1

In a pneumatic tire including a tread surface shown in FIG. 1, the depth of each of the main grooves 3 and each of the lateral grooves 4 were set to 8.7 mm; the depth of each of the sipes 5 was set to 6.3 mm, and the sipes 5, of which the sipe width is 0.3 mm, without the wide portion shown in FIGS. 2 to 4 and 6 were formed in the land portion on the tread surface to manufacture pneumatic tires. Using the above tires, the evaluation was made on the respective performances. The results are shown in Table 1.

Comparative Example 2

In a pneumatic tire including the tread surface 1 shown in FIG. 1, the pneumatic tire with the same structure as that of the Comparative Example 1 was manufactured except a point that the entire of the edge portion of the sipes 5 was made of, along the longitudinal direction, an inclined plane, and the sipe width of each of the sipes 5 on the tread surface of the road surface was set to 0.6 mm; and the depth of each of the inclined planes from the tread surface of the road surface was set to 2 mm. Using the above tires, the evaluation was made on the respective performances. The results are shown in Table 1.

Examples 1 to 6

In pneumatic tires shown in FIGS. 1 to 3, each of the pneumatic tires with the same structure as that of the Comparative Example 1 was manufactured except a point that each of the sipe 5 include the wide portion 6 in which the length W of each of the inclined planes I on the tread surface of the road surface extending in the longitudinal direction of the sipe, a length T of each of the side faces E on the tread surface of the road surface, and a depth D of each of the inclined planes I on the tread surface of the road surface, were set to the dimensions as listed in Table 1. Using the above tires, the evaluation was made on the respective performances. The results are shown in Table 1.

Example 7 to 8

Each of pneumatic tires with the same structure as that of the Examples 1 to 6 was made except a point that a length T1 of the respective side faces E in the longitudinal direction was set to the dimensions listed in Table 1, each of the sipes 5 has pluralities of wide portions 6 shown in FIG. 4. Using the above tires, the evaluation was made about the respective performances. The results are shown in Table 1.

Comparative Example 3

Figure 6:
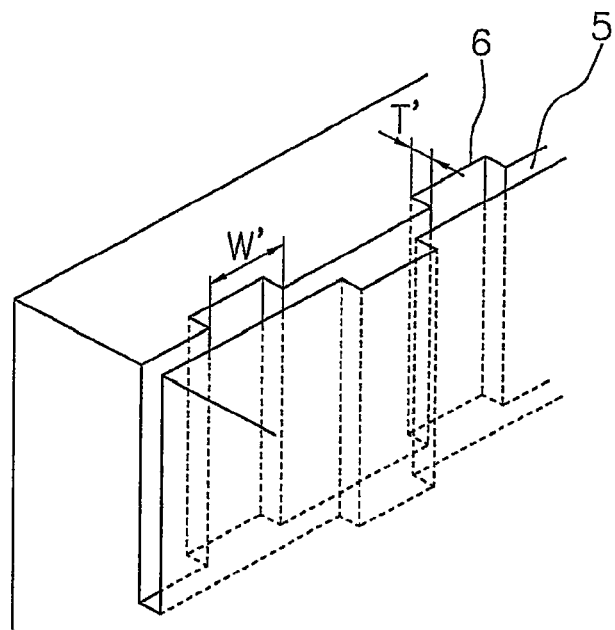
FIG. 6 is an enlarged view of an example of a sipe of Comparative Example 3.

In a pneumatic tire having the tread surface 1 shown in FIG. 1, a pneumatic tire with the same structure as that of the Comparative Example 1 was manufactured except a point that as shown in FIG. 6, the sipe 5 was made to have a length W' in the longitudinal direction of 2 mm; a length T' of the side faces of 0.3 mm; and pluralities of wide portions 6 having a wider portion from the tread surface of the road surface to the sipe bottom (not having inclined plane) were disposed alternately on the both sipe walls along the longitudinal direction of the sipe 5. Using the above tires, the evaluation was made on the respective performances. The results are shown in Table 1.

TABLE 1

| | | Comparative Example 1 | Comparative Example 2 | Comparative Example 3 | Example 1 | Example 2 | Example 3 | Example 4 | Example 5 | Example 6 | Example 7 | Example 8 |
|---|---|---|---|---|---|---|---|---|---|---|---|---|
| Dimensions | W | — | — | — | 1 | 3 | 2 | 2 | 2 | 2 | 2 | 2 |
| | T | — | — | — | 0.3 | 0.3 | 0.2 | 0.4 | 0.3 | 0.3 | 0.3 | 0.3 |
| | D | — | — | — | 2 | 2 | 2 | 2 | 0.5 | 3.5 | 2 | 2 |
| | T1 | — | — | — | — | — | — | — | — | — | 0.3 | 0.7 |
| Ice braking performance | | 100 | 106 | 102 | 105 | 103 | 104 | 105 | 107 | 104 | 106 | 105 |
| Ice turning performance | | 100 | 97 | 101 | 104 | 102 | 102 | 104 | 104 | 103 | 105 | 107 |
| Dry steering stability performance | | 100 | 93 | 90 | 95 | 97 | 97 | 95 | 97 | 95 | 97 | 99 |

From Table 1, it is understood that, compared to the pneumatic tire of the Comparative Example 1, the pneumatic tires of the Examples 1 to 8 are superior in both of the ice braking performance and the ice turning performance while increasing the dry steering stability performance. Particularly, in the pneumatic tires of Examples 7 to 8, the pair of side faces E of the wide portion 6 inclines so that the length of the inclined plane I decreases toward the groove bottom of the sipe 5. Therefore, the ice turning performance is remarkably increased. On the other hand, in the pneumatic tire of the Comparative Example 2, the pneumatic tire has no edge element that acts in the width direction of the tire (turning directions) of the tire. Therefore, compared to the pneumatic tire of the Comparative Example 1, the ice turning performance was reduced. In the pneumatic tire of the Comparative Example 3, the pneumatic tire has no inclined plane at the opening side of the sipe. Therefore, there is no edge element that acts in the circumferential direction (braking direction) of the tire. Further, the pneumatic tire has wide portions arranged to be wider than the other portion from the tread surface of the road surface to the sipe bottom. Therefore, compared to the pneumatic tire of the Comparative Example 1, although the ice braking performance and the ice turning performance are slightly increased, but the dry braking performance is largely reduced.

What is claimed is:
1. A pneumatic tire comprising a tread surface including a land portion in which a sipe extending in a width direction of the tire is formed, the sipe having:
   pluralities of wide portions each having an inclined plane that begins from the tread surface for contacting a road surface, and terminates in a sipe wall, wherein the ratio (D/H) of the depth (D) of the inclined plane with respect to the depth (H) of the sipe as a percentage is 7 to 40%, while inclining so that a sipe width decreases toward the groove bottom of the sipe, and
   a pair of side faces connecting the inclined plane and the sipe wall therebetween, wherein the pluralities of wide portions are located alternately on both sipe walls along a longitudinal direction of the sipe,
wherein the pair of side faces of the wide portion incline toward the groove bottom of the sipe so that the length of the inclined plane decreases and
wherein a length of the side faces in the longitudinal direction is 0.3 to 1 mm and a depth of the inclined plane from the tread surface is 0.5 to 4 mm.

* * * * *